United States Patent Office 3,580,927
Patented May 25, 1971

3,580,927
ULTRAVIOLET LIGHT INHIBITORS
Robert L. Wear, West St. Paul, Minn., assignor to Minnesota Mining and Manufacturing Company, St. Paul, Minn.
No Drawing. Filed Nov. 24, 1967, Ser. No. 685,329
Int. Cl. C07d 3/00; C07c 49/82
U.S. Cl. 260—333
3 Claims

ABSTRACT OF THE DISCLOSURE

Ultraviolet light absorbers with extremely low volatility are prepared by reacting 2,4-dihydroxybenzophenone and organic dihalides or diepoxides. The resultant compounds have the general formula

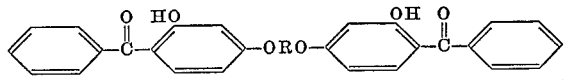

where R is a divalent organic radical. These compounds may be used as carriers for dye, permitting the internal coloring of polyester films and fibers.

BACKGROUND OF THE INVENTION

Such polymeric materials as plastics, rubbers, coatings, colorants, and particularly thermoplastic polymers, are photochemically degraded by exposure to terrestrial sunlight, fluorescent lights, and other sources of ultraviolet (UV) radiation, especially in the 300–370 nanometer wavelength. Accordingly, it has long been common practice to blend into thermoplastic polymers minor amounts of such UV inhibitors as o-hydroxybenzophenones, 2-(2'-hydroxyphenyl) benzotriazoles, substituted acrylonitrile and salicylates. Such inhibitors are believed to function by absorbing a high percentage of the damaging radiation and converting the absorbed energy to heat, or some other harmless wavelength.

Although the o-hydroxybenzophenones and their derivatives impart little or no color and are considered effective in counteracting the effect of UV radiation in the 290–380 nm. range, their utility has heretofore been limited. For example, the comparatively high temperature employed in processing polyester film and fibers tends to "smoke out" (i.e., volatilize) any UV inhibitor included in the polymer. The volatilized inhibitor not only is wasted, but also is unpleasant for workers in the vicinity and tends to both corrode and contaminate the processing equipment. To minimize this problem, benzophenone inhibitors are often incorporated in a composition which has a lower melting point than polyester and coated on the surface of oriented film, even though this technique greatly reduces the chelating antioxidant effect of the inhibitor. Even when it is applied in this way, the inhibitor tends to evaporate or sublime when exposed to elevated temperature and/or reduced pressure, e.g., when incorporated in or on plastic equipment used in space vehicles, satellites, etc. Further, it is difficult to adhere such coatings adequately, especially when the coated film is subjected to rough handling. Coating techniques are generally unsuited for work with fibers.

SUMMARY

The present invention provides novel UV stabilizers which have all the advantages of benzophenone compounds without the disadvantages discussed above. Compounds made in accordance with this invention have extremely low volatility, thereby facilitating their use in commercial equipment, where "smoking out" is effectively eliminated, even at comparatively high temperatures and/or low pressures. Compounds of this invention can be tailored to specific situations required; e.g., the melting point can be adjusted to virtually any desired range.

The foregoing advantages are achieved with compounds of the formula

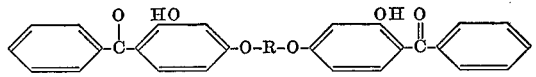

where R is a divalent organic radical. Such compounds may be prepared by reacting 2,4-dihydroxybenzophenone and an organic dihalide or diepoxide chosen to provide desired physical characteristics. The terminal rings may, if desired, be substituted with halogen, alkyl, or alkoxy radicals to further reduce volatility and/or modify solubility characteristics.

DESCRIPTION OF PREFERRED EMBODIMENTS

To facilitate understanding of the invention, certain illustrative but non-limiting examples will now be provided.

Example 1

This example describes the preparation of

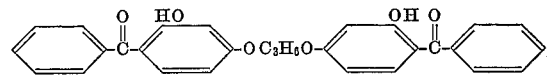

To a stirred suspension of 642 grams (3.0 mols) of 2,4-dihydroxybenzophenone and 1 liter of ethylene glycol, 162 grams (3.0 mols) of sodium methoxide was added. A mild exotherm was observed, the solid dissolving to form a clear red solution. The solution was placed in a 3-liter flask provided with stirrer, thermometer, condenser, a nitrogen inlet and heating mantle, and 303 grams (1.5 mols) of 1,3-dibromopropane added. The solution was then heated as follows:

| Time, minutes | Pot temperature, C. | Remarks |
|---|---|---|
| 0 | 60 | Started to heat. Clear red solution. |
| 40 | 121 | Refluxing. Two phases present. |
| 215 | 123 | Started to distill off methanol through a Vigreaux column. |
| 255 | 132 | 26 ml. methanol collected. |
| 315 | 152 | 63 ml. methanol collected; again refluxing. |
| 435 | 152 | Shut off heat. |

The reaction mixture was cooled to room temperature, revealing a thick layer of solid on top of a clear liquid. The liquid was poured off, the solid dissolved by heating with one liter of ethylene glycol monomethylether, and the hot solution filtered and cooled. A yellow crystalline solid in the cooled filtrate was washed once with a 1:1 ethanol: ethylene glycol monoethylether blend and twice with ethanol. The resultant yield was 430 grams, or 61% of the theoretical amount, of a yellow crystalline material having a melting point of 128.5–130° C. An analytical sample was obtained by recrystallizing the material from ethyl acetate. Calculated for $C_{29}H_{24}O_6$, the theoretical amounts of C and H were respectively 74.35% and 5.16%; the actual values measured were respectively 74.5% and 5.2%.

Three lots of 1-mil film were prepared by extruding polyethylene terephthalate compositions at 282° C. The control Lot A contained no inhibitor; to Lot B 2.9% 2-hydroxy, 4-methoxybenzophenone ("Uvinul" M-40, a well known UV inhibitor commercially abailable from General Aniline & Film Corporation) was added in the extruder; to Lot C 4.3% of the product of this example was likewise added in the extruder. During extrusion and subsequent orientation, it was noted that clouds of the UV inhibitor of Lot B volatilized and condensed on the equipment. No such tendency was noted for either control Lot A or experimental Lot C.

Samples taken from each of the three lots of film were then carefully weighed, heated for 1 hour at 180° C. and reweighed. The weight of the samples taken from Lots A and C remained constant, while the weight of the sample taken from Lot B decreased, 1.7%, which apparently was all of the original 2.9% commercial UV inhibitor actually remaining in the film after extrusion.

Samples of film taken from Lots B and C were then subjected to thermogravimetric analysis. Each sample was placed on a balance in an oven at room temperature and the air exhausted to a pressure of less than 0.1 mm. Hg. Heat was then supplied to the oven at a rate which maintained a constant temperature increase of 2.5° C. per minute, the weight being constantly monitored. Results are tabulated below, in terms of percent of UV absorber originally present:

| | | Sample UV absorber | |
|---|---|---|---|
| | | Lot B ("Uvinul" M-40) | Lot C |
| Time, min. | Temp., °C. | Total percent UV absorber lost | |
| 0 | 20 | 0 | 0 |
| 20 | 70 | 17.7 | 2.3 |
| 28 | 90 | 35.4 | 3.5 |
| 38 | 105 | 53 | 3.5 |
| 46 | 135 | 100 | 4.7 |

To compare the UV absorbing effectiveness of the conventional "Uvinul" M-40 compound and the product of this Example, 0.5% solutions of each in chloroform were prepared. When the two solutions were evaluated on a Cary spectrophotometer, their UV absorption curves could not be distinguished from each other.

The UV absorber of this Example 1 can also be prepared in the following manner: To a stirred mixture of 12 grams of sodium hydroxide and 100 ml. of ethylene glycol moonmethylether, 64.2 grams (0.3 mol) of 2,4-dihydroxybenzophenone is added, followed by 30.3 grams (0.15 mol) of 1,3-dibromopropane. The mixture is stirred and refluxed at 115–120° C. for five hours, after which the hot reaction mixture is filtered. From the cooled filtrate, 42.5 grams (61%) of the product is obtained.

Example 2

Following the general procedure outlined in Example 1,

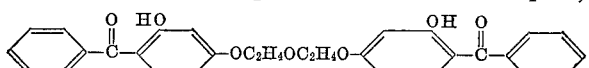

was prepared in the following manner: A mixture of 1 liter of ethylene glycol, 642 grams (3.0 mols) of 2,4-dihydroxybenzophenone, 162 grams (3.0 mols) of sodium methoxide, and 214 grams (1.5 mols) of 2-chloroethylether was stirred and heated for 255 minutes, at the end of which time a stiff brown gum had formed on the bottom of the flask. The liquid layer was decanted and the gum washed with three 1-liter portions of hot water by decantation, and then heated with 1 liter of ethanol. The gum suddenly turned into a very hard solid chunk, which was gradually dissolved by adding 400 ml. of ethylene glycol monomethylether (methyl "Cellosolve") and heating, and the hot solution filtered. The filtrate was cooled, and the crystalline precipitate which formed was collected and washed with ethanol. The yield was 425 grams (61%) of a solid material which was recrystallized from 1800 ml. of ethyl acetate to give 341 grams (46%) of a crystalline material having a melting point of 128–129.5° C. An analytical sample was obtained by recrystallizing from ethyl acetate. Calculated for $C_4H_{26}O_7$, the theoretical percent C and H was respectively 72.27 and 5.26; the actual values found were respectively 72.0 and 5.3.

Alternatively, the compound of this example can be prepared by a simpler process wherein NaOH is used instead of sodium methoxide, the water wash and ethanol heating are omitted and recrystallization is carried out from ethylene glycol monomethylether.

Example 3

This example describes the preparation of an ultraviolet light absorber formed by reacting 2,4-dihydroxybenzophenone and a diepoxide.

In the presence of a catalytic amount of pyridine, a bisphenol A epoxy resin ("Epon" 828, commercially available from Shell Chemical Company) was heated for 2 hours at 120° C. with 2,4-dihydroxybenzophenone. The resultant product was a low melting glass which formed a very viscous liquid.

Example 4

Example 3 was repeated, substituting 1,4-butane diol diglycidyl ether for the epoxy resin. The resultant reaction product was a semi-glass which formed a readily flowable liquid.

The tendency of a given UV absorber to "smoke out" during processing of a plastic which contains it, can be predicted by a variation of the thermogravimetric analysis procedure previously described. In this procedure, 100-mg. sample of powdered absorber is placed on a balance in an oven at room temperature. While the atmosphere is slowly flushed with nitrogen to minimize oxidative deterioration, the temperature is increased at a constant rate of 5° C. per minute. The temperature at which 5 mg. of sample have volatilized is noted, and reported as "$T_5$"; the higher this temperature, the less volatile the sample.

The following table sets forth a number of compounds, illustrating the wide variety of UV absorbers having the general formula

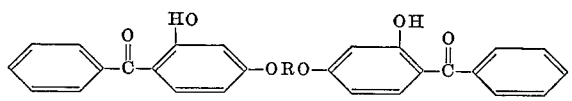

which can be formed in accordance with this invention. For convenience, the compounds of previous examples are also included. Weight losses at 180° C. and thermogravimetric "$T_5$" values are reported for several compounds.

| Example | R | Melting point, °C. | $T_5$, °C. | Percent weight loss[1] |
|---|---|---|---|---|
| 5 | —CH₂— | 114–117 | | |
| 6 | —C₂H₄— | 211–213 | 410 | 0 |
| (1) | —C₃H₆— | 128.5–130 | 410 | |
| 7 | —C₄H₈— | 159–163 | | |
| 8 | —C₅H₁₀— | 145–147 | 425 | 0 |
| 9 | —C₁₀H₂₀— | 118–121 | | |
| 10 | —CH₂CH=CHCH₂— | 188–190 | | |
| (2) | —C₂H₄OC₂H₄— | 128–129.5 | 420 | 0.5 |
| 11 | —C₂H₄OC₂H₄OC₂H₄— | 104.5–106 | 410 | 1 |
| 12 | —C₄H₈OC₄H₈— | 77–82 | | 0 |
| 13 | —CH₂CH(OH)CH₂— | 149–150 | | 0.5 |
| 14 | —CH₂C(CH₂OH)₂CH₂— | 150–152 | | |
| (3) | —CH₂CH(OH)CH₂O—C₆H₄—C(CH₃)₂—C₆H₄—O—CH₂CH(OH)CH₂— | | | 1.2 |
| (4) | —CH₂CH(OH)CH₂O—C₄H₈—O—CH₂CH(OH)CH₂— | | | 3 |
| 15 | —CH₂—C(CH₂)(CH₂)—CH₂— (with O bridge) | 162–164 | | |
| 16 | —CH₂—C₆H₄—CH₂— | 221–222 | | |
| Control | 2-hydroxy, 4-methoxy benzophenone ("Uvinul" M-40) | 260 | | 80 |
| Control | 2,2'-dihydroxy, 4-methoxybenzophenone ("Cyasorb" 24) | 280 | | 34 |
| Control | 2,4-dihydroxy benzophenone ("Uvinul" 400) | 290 | | 25 |

[1] Of 1 gram after 1 hour at 180° C.

It will be noted that a wide variation in the chemical nature of the R group is possible, enabling selection of a UV inhibitor having a melting point and solubility suited to the polymer in which it is to be incorporated, as well as the manufacturing process.

It has heretofore been extremely difficult to dye polyesters and other high melting polymers internally, since it is a practical necessity to dilute the dye with a carrier which is both a solvent for the dye and compatible with the polymer; before adding, previously known carriers tended to "smoke out" when blended with the molten polymer. Because of the difficulties in dyeing polyester films internally, it has heretofore been the custom to apply a thin coating of the dye to one or both surfaces of a finished biaxially oriented polyethylene terephthalate film, such practice permitting the use of lower boiling dye carriers but lacking the desired degree of uniformity and durability; such methods also frequently warp and buckle a previously flat film. Further, fibers cannot conveniently be coated in this way. The following example shows how compounds made in accordance with this invention can serve the dual functions of dye carrier and UV inhibitor, yielding uniformly dyed light-stable polyethylene terephthalate which can be formed into either films or fibers.

EXAMPLE 17

An internally dyed gold-colored polyester film was prepared as follows:

20 parts of the inhibitor of Example 2 was melted, held below 175° C., 2.2 parts by weight of an orange dye ("Orasol Orange G 105%, available from Ciba Chemical Company") added, and stirred to effect a uniform blend, or solution. The blend was now continuously added to 978 parts of molten polyethylene terephthalate in an extruder, with thorough mixing to insure uniform distribution of the dye and carrier throughout the polymer. A film approximately 10 mils thick was extruded and then biaxially oriented to a thickness of 0.92 mil. The resultant transparent product had a uniform gold color and excellent ultraviolet light resistance; when metallized on one face it yielded a product suitable for the preparation of decorative gold strips for automotive interior trim or decals for slitting to narrow widths as a component of decorative wearing apparel, etc.

As has been indicated, the linking R group in the novel UV absorbers can be chosen to obtain a desired melting point, solubility in a specific polymer or solvent, etc. Generally speaking, relatively low molecular weights are preferred. Thermal stability of the absorbers is enhanced if the R group is not ethylenically unsaturated. Other considerations will readily occur to those faced with specific needs.

Numerous applications of this invention, and corresponding modification of the foregoing teaching, are within the skill of the art. It will be helpful, however, to bear certain principles in mind. For example, 5% UV absorber can be included in a polyester formulation, although less amounts are generally adequate, and cost is a limiting factor. Where the polyester formulation contains dyes or dispersible pigments (which are generally more susceptible to UV attack than the polyester), it is prudent to include more absorber than where no dye or pigment is present. Similarly, particularly severe exposure to UV light will probably require more absorber than more moderate environments.

I claim:

1. A UV inhibitor having the structural formula

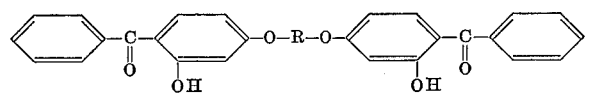

wherein R is an organic radical selected from the group consisting of alkylene radicals, alkenylene radicals, —C$_n$H$_{2n}$OC$_n$H$_{2n}$—, where $n$ is 2–4,

—C₂H₄OC₂H₄OC₂H₄—,

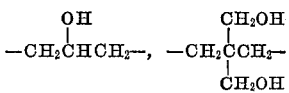
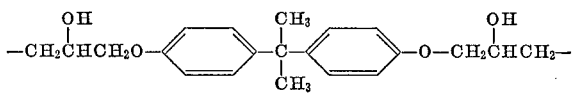
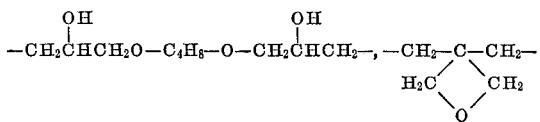
and
2. The inhibitor of claim 1, wherein R is —C$_3$H$_6$—.
3. The inhibitor of claim 1, wherein R is
—C$_2$H$_4$OC$_2$H$_4$—
References Cited
UNITED STATES PATENTS
3,146,269   8/1964   Braus et al. _____ 260—591
DANIEL D. HORWITZ, Primary Examiner
U.S. Cl. X.R.
260—591, 45.95; 252—404, 300